UNITED STATES PATENT OFFICE.

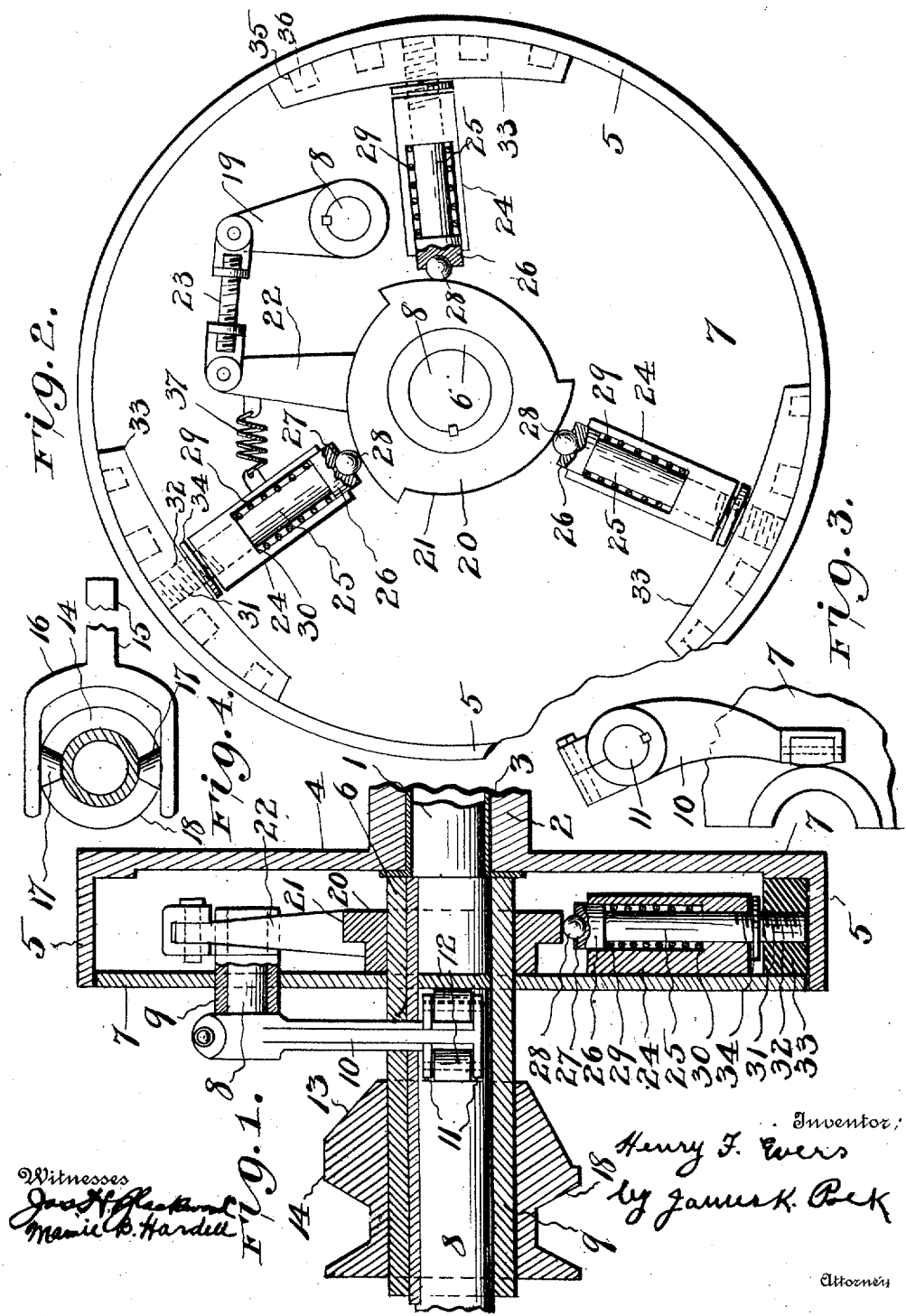

HENRY F. EVERS, OF CLYDE, OHIO.

FRICTION-CLUTCH.

988,987. Specification of Letters Patent. Patented Apr. 11, 1911.

Application filed May 13, 1910. Serial No. 561,219.

*To all whom it may concern:*

Be it known that I, HENRY F. EVERS, a citizen of the United States, and a resident of Clyde, in the county of Sandusky and State of Ohio, have invented certain new and useful Improvements in Friction-Clutches, of which the following is a specification.

My invention relates to friction clutches for coupling the motor to the transmission gearing of an automobile, and has for its object the provision of a clutch that will insure a gradual engagement of the clutch-shoes with the driving-casing, so as to dispense with the sudden jerk or jar experienced in clutches as ordinarily constructed and at the same time is extremely simple in construction, reasonable in cost of manufacture, and in the highest degree successful in operation.

My invention will be described in detail hereinafter and illustrated in the accompanying drawings, in which—

Figure 1 is a side view, partly in section, of my improved friction-clutch; Fig. 2, a plan view of the clutch-plate; Fig. 3, a side view of the clutch-shoe operating-arm; and Fig. 4, a fragmental view of the clutch-operating sleeve and lever.

In the drawings similar reference characters will indicate corresponding parts throughout all of the views.

The driven shaft 1 has a hub 2, rotatably mounted thereon, to which is secured a gear-wheel or pulley (not shown) in gear with the motor (not shown), 3 designating a bearing-face on the interior of the hub 2 of any suitable material, such as Babbitt metal. One end of hub 2 is formed with an integral circular plate 4, having a flange 5 extending laterally from its outer edge.

6 indicates a sleeve keyed to shaft 1 and having a circular plate 7 extending laterally therefrom intermediate of its ends and fitting in the inclosure formed by flange 5.

8 indicates a stub-shaft journaled in bearing 9 in plate 7, on which is secured an arm 10, having its end formed with laterally-extending bearings 11, in which are journaled bearing-rollers 12, one of which engages the plate 7 and the other is engaged by the beveled surface 13 of sleeve 14, slidably mounted on sleeve 6. Sleeve 14 is actuated by lever 15, having a bifurcated end 16, with rollers 17 journaled thereon, that engage a groove 18 in the sleeve.

19 indicates an arm secured to the end of stub-shaft 8, inside of the casing formed by plates 4 and 7 and flange 5, 20 a ring rotatably mounted on sleeve 6 and formed with a plurality of cam-surfaces 21 on its inner periphery and a radial arm 22 extending therefrom that is connected with arm 19 by means of an adjustable link 23.

24 indicates a plurality of radial casings secured to plate 7, in which are slidably mounted pins 25, having their heads 26 each formed with a socket 27 to receive a bearing-ball 28 that engages one of the cam-surfaces 21, said ball being held in engagement with said surface by an expansible coil-spring 29, interposed between the head 26 of the pin and a shoulder 30 in the casing. The outer ends of the pins 25 are threaded, as shown at 31, to engage threaded apertures 32 in bearing-shoes 33.

34 indicates a nut engaging the pin to hold the shoe in place.

The shoes 33 are made of any suitable material, such as brass, and may, if desired, be provided with a plurality of sockets 35 to receive plugs 36 of fibrous material, such as wood, to add to the frictional efficiency of the shoes, though the shoes may be made without provision for the plugs, if desired.

In operation it will be understood that when the motor is in operation the hub 2 and flanged plate 4 rotate freely on the shaft 1 until the lever 15 is moved, so as to actuate the sleeve 14 toward plate 7 when the roller 12 will be forced to ride on the beveled surface 13 of the sleeve and arm 10 will swing outwardly. This movement of the arm 10 will turn the stub-shaft 8 and with it arm 19, which in turn will rotate ring 20, through arm 22 and link 23. This movement of the ring 20 will cause the outward movement of bearing-shoes 33, through the instrumentality of the cam-surfaces 21 of the ring so that the shoes gradually engage the inside of flange 25, finally locking the flange tightly and the plate 7 and its integral sleeve 6 together with the shaft 1 will be rotated.

37 indicates a retractile coil-spring connecting arm 22 and one of the casings 24 to return the ring to its normal position when the sleeve 14 is moved away from plate 7, and the shoes 33, being withdrawn from engagement with flange 5, shaft 1 will cease to rotate.

Having thus described my invention, what I claim is—

1. In a friction-clutch, a shaft, a member rotatably mounted on the shaft, a flanged plate operatively connected to said rotatable member, a sleeve secured to the shaft, a plate extending from said sleeve and seated within the flange aforesaid, a ring rotatably mounted on the sleeve and having a plurality of cam-surfaces, clutch-shoes slidably mounted on the last-mentioned plate and engaging said ring, means to rotate the ring to actuate the shoes to clamp the flange, and means to actuate the shoes out of engagement with the flange, substantially as shown and described.

2. In a friction-clutch, a shaft, a member rotatably mounted on the shaft, a flanged plate operatively connected to said rotatable member, a sleeve secured to the shaft, a plate extending from said sleeve and seated within the flange aforesaid, casings secured to the last-mentioned plate, pins slidably mounted in said casings, a clutch-shoe secured to each pin and adapted to engage the flange, a cam-ring rotatably mounted on the sleeve and engaging said pins to actuate the shoes into a clamping position, means to rotate said cam-ring, and means to actuate the shoes out of engagement with the flange, substantially as shown and described.

3. In a friction-clutch, a shaft, a member rotatably mounted on the shaft, a flanged plate operatively connected to said rotatable member, a sleeve secured to the shaft, a plate extending from said sleeve and seated within the flange aforesaid, a cam-ring rotatably mounted on the sleeve and having an arm extending radially thereof, a stub-shaft journaled on the last-mentioned plate, an arm on one end of the stub-shaft and linked to the arm on the sleeve, an arm secured to the other end of the stub-shaft, means engaging the last-mentioned arm to rotate the stub-shaft and ring, and clutch-shoes slidably mounted on the last-mentioned plate and engaging the cam-ring, substantially as shown and described.

4. In a friction-clutch, a shaft, a member rotatably mounted on the shaft, a flanged plate operatively connected to said rotatable member, a sleeve secured to the shaft, a plate extending from said sleeve and seated within the flange aforesaid, a cam-ring rotatably mounted on the sleeve and having an arm extending radially thereof, a stub-shaft journaled on the last-mentioned plate, an arm on one end of the stub-shaft and linked to the arm on the sleeve, an arm secured to the other end of the stub-shaft, a sleeve slidably mounted on the first-mentioned sleeve and having a beveled surface to engage the last-mentioned arm and swing it outwardly to rotate the stub-shaft and cam-ring, and clutch-shoes slidably mounted on the last-mentioned plate and engaging the cam-ring to move the shoes into engagement with the flange aforesaid, substantially as shown and described.

5. In a friction-clutch, a shaft, a member rotatably mounted on the shaft, a flanged plate operatively connected to said rotatable member, a sleeve secured to the shaft, a plate extending from said sleeve and seated within the flange aforesaid, a cam-ring rotatably mounted on the sleeve and having an arm extending radially thereof, a stub-shaft journaled on the last-mentioned plate, an arm on one end of the stub-shaft and linked to the arm on the sleeve, an arm secured to the other end of the stub-shaft, a sleeve slidably mounted in the first-mentioned sleeve and having a beveled surface to engage the last-mentioned arm and swing it outwardly to rotate the stub-shaft and cam-ring, casings secured to the last-mentioned plate, pins slidably mounted in said casings and having ball-bearings in their inner ends to engage the cam-ring aforesaid, clutch-shoes secured to said pins and adapted to engage the flange, and springs engaging the pins and casings to release the shoes from engagement with the flange, substantially as shown and described.

In witness whereof, I have hereunto set my hand in presence of two subscribing witnesses.

HENRY F. EVERS.

Witnesses:
HOMER METZGAR.
ARTHUR H. WICKS.